June 24, 1930.  C. H. HAPGOOD  1,767,844
WEIGHING SCALE
Filed Nov. 12, 1927  3 Sheets-Sheet 1
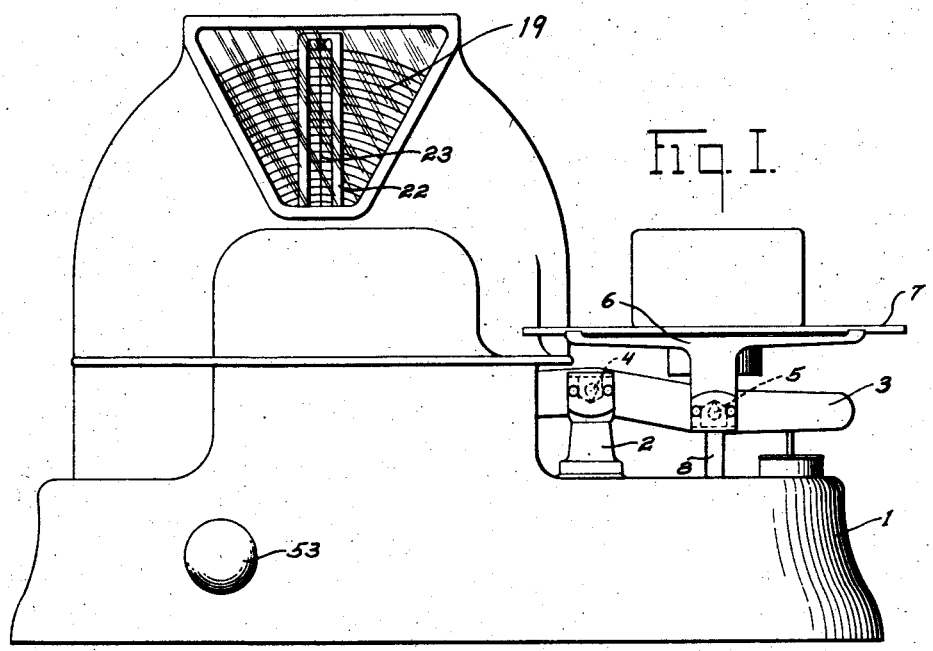
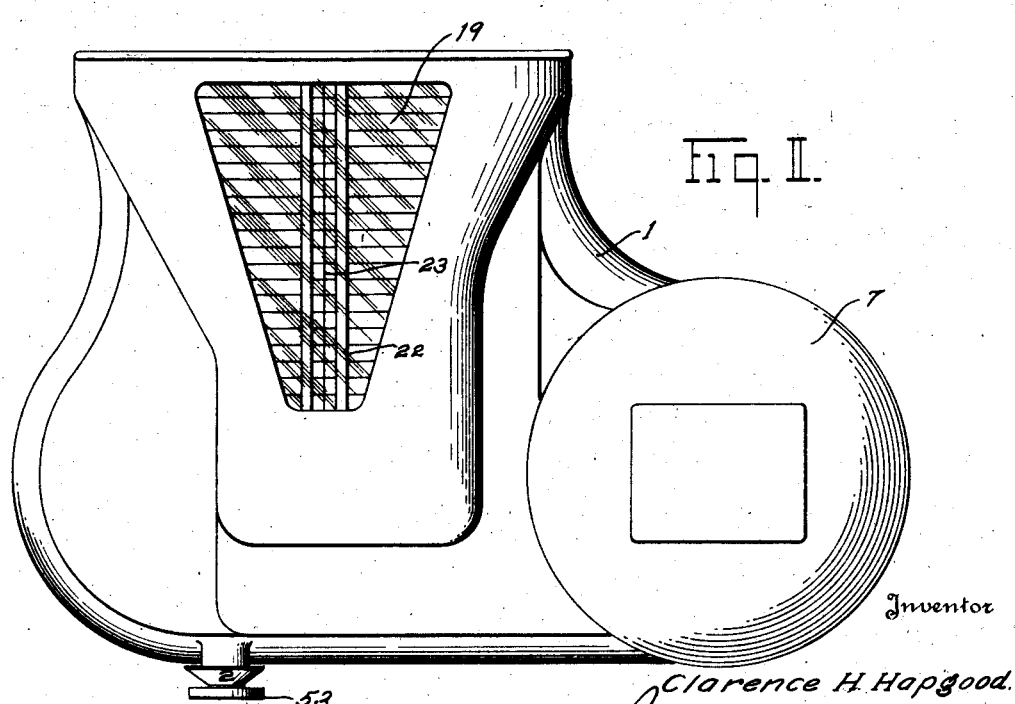
Inventor
Clarence H. Hapgood.
By
Attorney

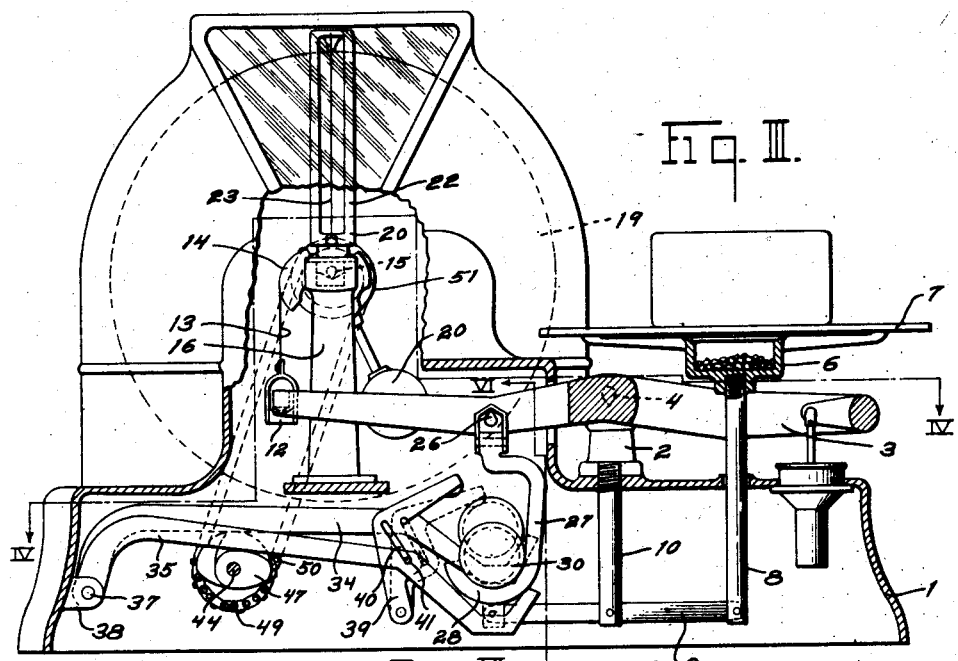
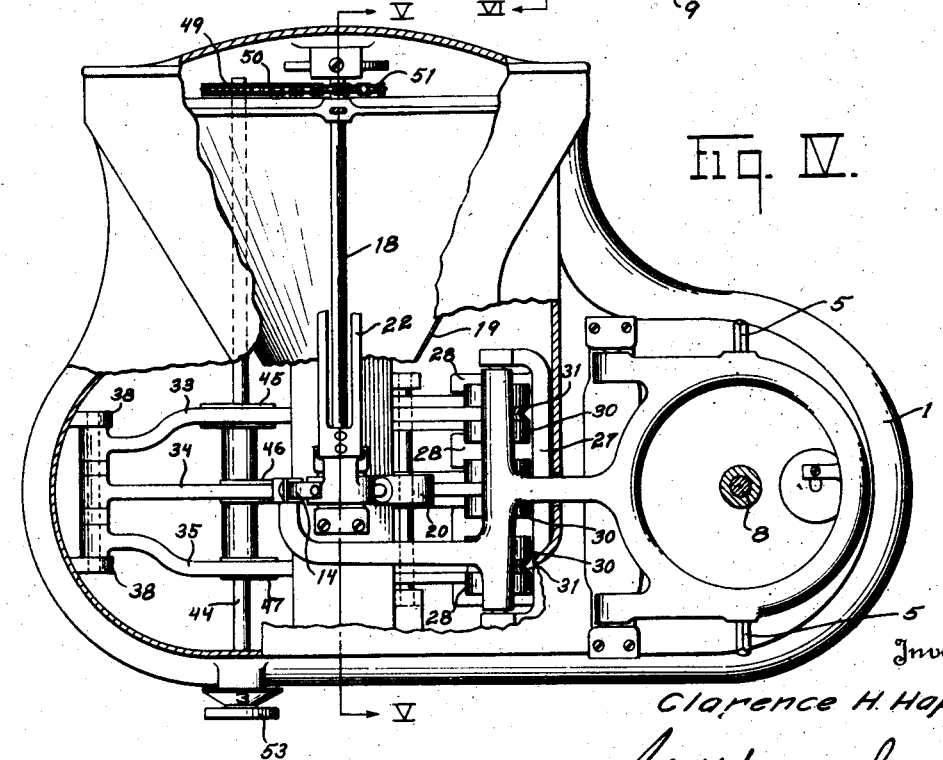

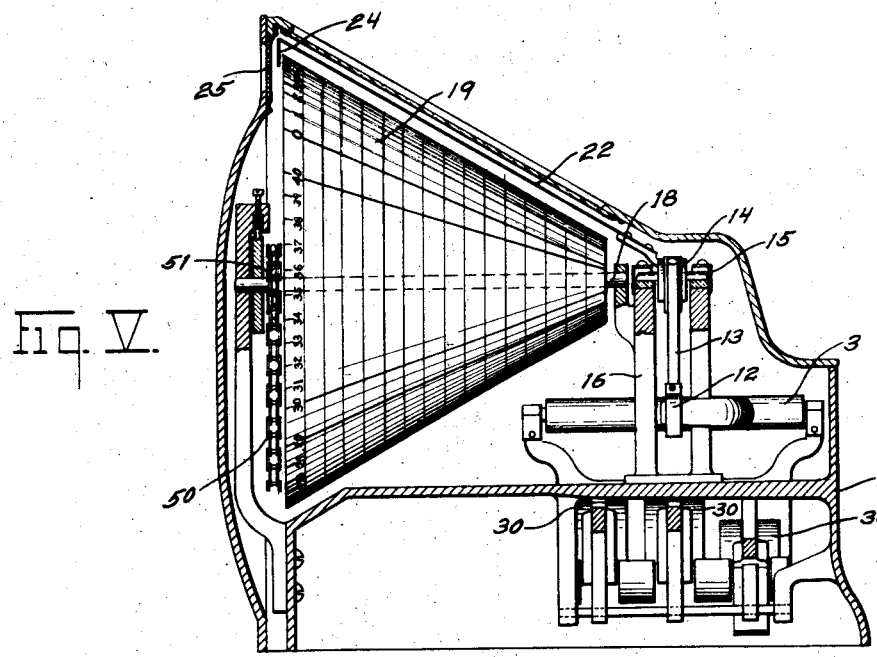
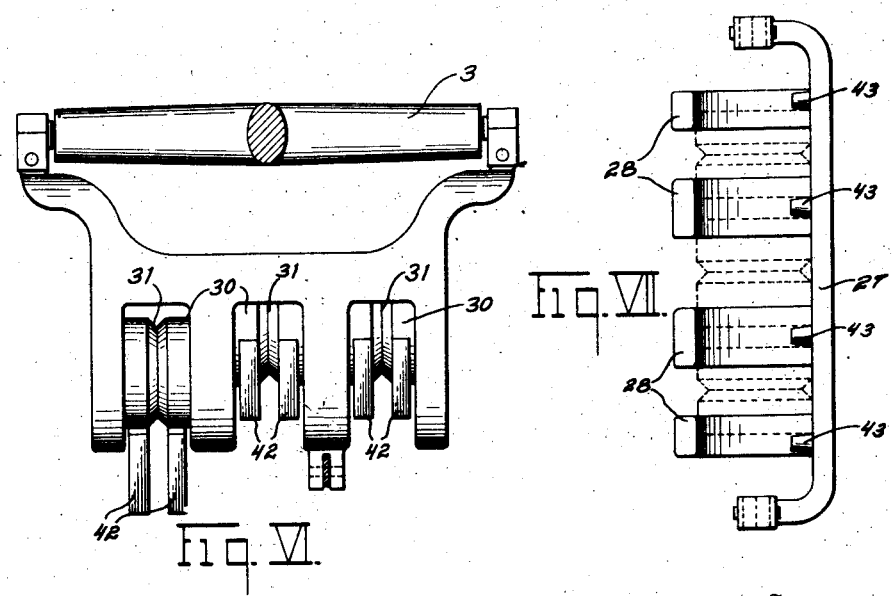

Patented June 24, 1930

1,767,844

UNITED STATES PATENT OFFICE

CLARENCE H. HAPGOOD, OF TOLEDO, OHIO, ASSIGNOR TO TOLEDO SCALE COMPANY, OF TOLEDO, OHIO, A CORPORATION OF NEW JERSEY

WEIGHING SCALE

Application filed November 12, 1927. Serial No. 232,810.

This invention relates to weighing scales, and more particularly to scales of the computing type having means for increasing the normal capacity of the scale.

It has always been a difficult matter in the manufacture of counter computing scales to provide a scale having a comparatively large weighing capacity in combination with a chart having a range of price computations co-operating with the weighing mechanism throughout the entire capacity of the scale.

One of the principal objects of this invention is the provision of a computing counter scale embodying a capacity increasing device consisting of a plurality of unit weights which may be successively placed upon or removed from the main lever without liability of getting out of order.

Another object is the provision of a scale having a series of computing charts co-operating with a unit weight capacity increasing mechanism whereby a price computing chart is rendered available for use with each successive increase in capacity of the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of the scale of my invention;

Figure II is a top plan view of the scale shown in Figure I;

Figure III is an elevational view similar to that shown in Figure I, with parts broken away to clearly show the mechanism therein;

Figure IV is a horizontal sectional view through the scale taken substantially on the line IV—IV of Figure III;

Figure V is a vertical sectional view taken substantially on the line V—V of Figure IV, certain parts being shown in full lines;

Figure VI is an enlarged fragmentary sectional view taken substantially on the line VI—VI of Figure III;

Figure VII is an enlarged top plan view of the unit weight supporting means, the unit weights being shown in dotted lines.

Referring to the drawings in detail, I have shown the scale as comprising a base housing 1 mounted upon an upwardly projecting fulcrum stand 2 on which is fulcrumed the main lever 3. The main lever 3 is provided with a pair of pivots 5 upon which is pivoted a spider 6 supporting the commodity-receiving platform 7. Depending from the spider 6 is a rod or stem 8, and pivotally secured to the lower end thereof is a link 9, the link being pivoted intermediate its ends to the lower extremity of a post 10 fixed in the fulcrum stand 2. The load and fulcrum pivots 4 and 5 and the pivotal connections between the link 9, spider stem 8 and post 10 are arranged in parallelogrammatic relation so that the commodity-receiving platform will always remain in a lever position irrespective of the position of the load thereon.

One end of the lever 3 projects into an elevated portion of the base housing 1 and is connected to a stirrup 12 fixed to the lower end of a flexible metallic ribbon 13, the upper portion of which is fixed to and overlies the curved face of a cam or sector 14 forming an integral part of the load-offsetting pendulum 20 which is fulcrumed by means of the pivots 15 on a standard 16 mounted upon the base housing 1.

Journaled in suitable bearings is a shaft 18 carrying a cone-shaped chart 19 bearing a plurality of sets of weight and price graduations and computations. Affixed to the pendulum structure is an arm 22 carrying an indicating wire 23 which is adapted to swing over and co-operate with a selected portion of the conical chart 19 to indicate weights and values.

It is obvious from examination of the drawings that the pendulum 20 is normally in elevated position when there is no load upon the scale platform 7. If a load is placed upon the platform the downward pull upon the ribbon 13 is decreased proportionately to the mass of the load, and the pendulum swings downwardly until a position of balance is obtained, the indicator simultaneously swinging to a position to indicate the weight of the load upon the chart 19.

It is apparent that the normal capacity of the scale is necessarily limited and in order to provide a scale of greater weighing and computing capacity I have incorporated a unit weight capacity increasing mechanism which will now be described. The main lever 3 is provided with pivots 26 from which is suspended a yoke or weight-receiving member 27 formed with laterally extending fingers 28 adapted to receive and retain a plurality of unit weights 30. The weights are cylindrical in shape and are provided with circumferential grooves 31, for a purpose to be hereinafter explained. The unit weight operating levers 33, 34 and 35 are pivoted by means of a shaft 37 to bosses 38 integrally formed with the base 1. Pivotally secured to the base adjacent the extremities of the weight-operating levers is a plurality of movable fingers 39, the fingers being provided with slots 40 into which project pins 41 fixedly secured in the operating levers. The ends of the levers 33, 34 and 35 are suitably formed with furcations 42 so as to provide stable supports for the unit weights, the weights being held in proper spaced relation by means of slightly tapered projections 43. When the unit weights are in engagement with the yoke 27 the operating levers swing downwardly far enough to permit unrestrained movement of the weights and yoke during weighing operations, the fingers 39 being moved away from the unit weights by means of the pin-and-slot connections with the operating levers. When the levers are moved upwardly by means herein after to be described, the unit weights are elevated clear of the yoke and the grooves 31 in the weights are engaged by the fingers 39, and accidental derangement of the parts is entirely obviated.

The means for selectively operating the levers consists of a transversely positioned shaft 44 provided with a plurality of cams 45, 46 and 47 so arranged that each cam is adapted to co-operate with one of the weight operating levers. Fixedly mounted upon the rear end of the shaft is a sprocket wheel 49, the latter connected by means of a chain 50 a similar sprocket wheel 51 carried upon the chart supporting shaft 18. The lever operating shaft 44 is adapted to be operated by means of a knob 53.

In the operation of the scale, if the weight of the load does not exceed the normal capacity of the automatic load-counterbalancing mechanism, the load will be entirely offset by the automatic mechanism, the indicator 23 swinging to a position over a particular set of graduations on the chart 19 to indicate the weight and total price, if the latter is desired. In event that the load exceeds the normal capacity of the scale, additional load-counterbalancing weights may be brought into operative relation with the automatic mechanism in the following manner: Manipulation of the knob 53 operates to deposit one or more of the cylindrical weights 30 upon the protruding fingers of the yoke 27, thereby increasing the force available for offsetting or counterbalancing platform loads. The rotation of the shaft 44 to deposit the weights 30 upon the yoke 27 simultaneously moves the chart 19 through an angle proportionate to the number of unit weights, thus bringing a different set of weight graduations and price computations into co-operative relation with the indicator 23. In the particular embodiment shown I have employed three capacity increasing weights which necessitate four separate sets of weight graduations and price computations—viz, one for the normal automatic capacity, and three for selective use with the capacity increasing elements. For example, if the normal automatic capacity of the scale is 10 lbs. and a 25 lb. load is placed upon the scale platform, two of the weights 30 are first deposited upon the yoke 27, each unit weight being equal to the automatic capacity—i. e., 10 lbs., the remaining 5 lbs. being offset by the load-counterbalancing pendulum.

When the cams 45, 46 and 47 are moved to positions to elevate the weight operating levers 33, 34 and 35, the unit weights are simultaneously removed from the yoke 27 and are retained in the levers by means of the retaining fingers 39 which are moved into engagement with the circumferential grooves 31 by means of the pins 41 working in the slots 40. It is to be understood that the unit weights are selectively brought into engagement by successive movements of the knob 3 and continued movement of the knob 53 after the last of the series of unit weights has been deposited upon the yoke 27. A further movement of the knob operates to simultaneously remove all of the weights from the yoke through the medium of the levers 33, 34 and 35.

In order to provide simple means for indicating the weight of the commodity to the customer, I have formed the extremity of the indicating arm with a bent portion 24 which co-operates with a weight-graduated chart (not shown) at the large end of the cone-shaped chart 19 which is visible to the customer through a glazed opening 25 in the rear of the housing enclosing the weighing mechanism.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, automatic weighing mechanism, an indicating hand controlled by said automatic weighing mechanism, a chart bearing a plurality of sets of price computations, and manually operated means for selectively moving said sets of price computations into co-operative relation with said indicating hand.

2. In a device of the class described, in combination, automatic weighing mechanism, an indicating hand controlled by said automatic weighing mechanism, a conical chart bearing a plurality of sets of price computations, and manually operated means for selectively moving said conical chart to bring said sets of price computations into co-operative relation with said indicating hand.

3. In a device of the class described, in combination, automatic weighing mechanism, a pivoted indicating hand controlled by said automatic weighing mechanism, a conical chart having its conical axis in alignment with the pivotal axis of said indicating hand and bearing a plurality of sets of price computations, said indicating hand lying in substantial parallelism with the face of said chart, and manually operated means for selectively moving said chart to bring said sets of price computations into co-operative relation with said indicating hand.

4. In a device of the class described, in combination, automatic weighing mechanism, manipulative weighing mechanism, a conical chart having its conical axis disposed horizontally, a pivoted indicating hand having its pivotal axis in alignment with the conical axis of said chart, said hand lying substantially parallel to the conical face of said chart, means operatively connecting said indicating hand to said automatic weighing mechanism, and means operatively connecting said conical chart to said manipulative weighing mechanism.

5. In a device of the class described, in combination, automatic weighing mechanism, manipulative weighing mechanism, a conical chart having its conical axis disposed horizontally, said chart bearing a plurality of sets of price computations, a pivoted indicating hand having its pivotal axis in alignment with the conical axis of said chart, said hand lying substantially parallel to the conical face of said chart, means operatively connecting said indicating hand to said automatic weighing mechanism, and means operatively connecting said conical chart to said manipulative weighing mechanism to move said chart and selectively bring said sets of price computations into co-operative relation with said indicating hand.

6. In a device of the class described, in combination, automatic weighing mechanism including a movable indicating hand, a unit weight capacity increasing means supplementing said automatic weighing mechanism, a chart bearing a plurality of sets of weight graduations and a plurality of sets of value computations corresponding respectively to the sets of weight graduations, and means for bringing different sets of weight graduations and corresponding value computations into co-operative relation with said movable indicating hand by the operation of said unit weight capacity increasing means.

CLARENCE H. HAPGOOD.